Jan. 17, 1956   N. J. CAMPANELLA   2,731,628
STOP LIGHT INDICATOR
Filed Aug. 16, 1952
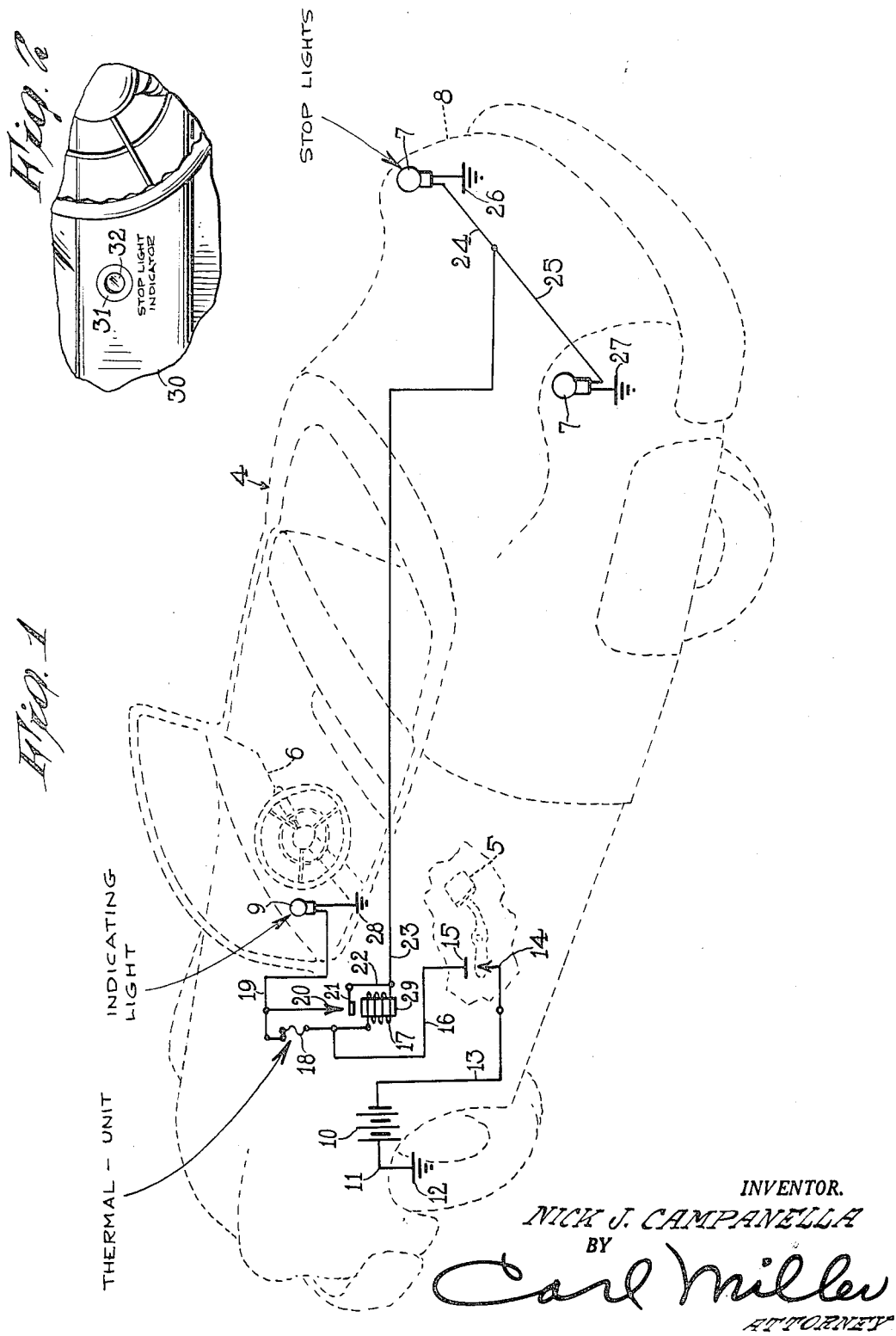
INVENTOR.
NICK J. CAMPANELLA
BY
Carl Miller
ATTORNEY

United States Patent Office 2,731,628
Patented Jan. 17, 1956

2,731,628

STOP LIGHT INDICATOR

Nick J. Campanella, Bound Brook, N. J.

Application August 16, 1952, Serial No. 304,765

2 Claims. (Cl. 340—252)

The present invention relates to signals and indicators for automobiles and like vehicles, and particularly to an electric stop light indicator for automobiles.

The main object of my invention is to equip an automobile having a brake operated switch with a relay circuit connected thereto and an indicator light in such fashion as to indicate whether or not the circuit and indicator light are in operative condition and capable of operating a stop light to warn following drivers of stops and slow downs.

Another object is to have an electric indicator and stop light system wherein a branch circuit includes the indicator light and is parallel with a circuit portion that includes the stop light.

An ancillary object is to include in the system a relay that automatically sends electric current to the stop light when the latter is in working order but remains inoperative when the stop light is burnt out or cannot pass current.

A further object is to have such an indicator system that is so arranged that when the stop light is operating properly upon the brake pedal being depressed, the indicator light will periodically blink on and off, but when the indicator light remains constantly illuminated when the pedal is pressed, it gives warning that the stop light is out of order and not functioning.

It is also an object to have an electric system of the character indicated that is reasonably simple to install, simple to operate and likewise reasonable in cost.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a phantom view of an automobile with a circuit diagram and features that embody the invention in a practical form; and Figure 2 is a fragmentary elevation of a portion of the dash board of the automobile showing one possible appearance of the indicator light thereon.

In these views, the same reference numerals indicate the same or like parts.

It is quite common to have stop lights on automobiles that become illuminated when the brake pedal is operated in order to notify following car drivers of stops or slow downs in order to avoid rear end collisions and other accidents.

However, it is ordinarily not possible to note whether or not the stop light is actually in operative condition, although in the dense traffic of today this is quite important.

Upon considering this problem, it has occurred to me that a special indicator light should be provided in an automatically operating electrical system that will indicate the exact condition of the stop light when the brake is applied, so that if it is not functioning, it will promptly be known so that it may be replaced. As a result, I have succeeded in producing an indicator and stop light system along the lines already mentioned, as will now be set forth in detail in the following.

Hence, in the practice of my invention, and referring also again to the drawing, an automobile, generally indicated at 4 has a brake pedal 5, a dash board or the like 6, and a pair of stop lights 7, 7 upon the rear portion 8 thereof. Upon or in the vicinity of the dash board 6 is mounted a special indicator light 9 that is connected to a current source and to the stop lights in a special manner.

The system is provided with a current source such as the storage battery 10 of the car, or some other battery, if desired, but it is connected by one lead 11 to ground or the car frame, at 12. Another conductor 13 runs to one contact 14 of the brake pedal 5 adapted to make effective contact with a stationary contact 15 when the pedal is depressed by the foot. From contact 15 runs a conductor 16 that is connected to a relay winding 17 and also to a thermal unit 18 connected in turn by conductor 19 with indicator light 9. From this latter conductor extends a contact 20 with which an armature 21 is adapted to co-operate and which is connected at 22 to the far terminal of solenoid 17 and another conductor 23. This conductor runs to the rear of the car and has two branches 24 and 25 connected to stop lights 7, 7, the other poles of these stop lights being connected to ground or the chassis at 26, 27, while a pole of the indicator light is also connected to ground or the chassis at 28. The circuit is thus complete with current source and operating lights. Also, the relay device including coil 17, movable contact and armature 21, stationary contact 20 and iron core 29, as well as thermal unit 18 form parts of the operating circuit.

So long as the brake pedal 5 is in its upper idle position, no current flows through relay coil 17, but as soon as this pedal is depressed by the foot, contacts 14 and 15 are brought together so as to close the circuit of battery 10 through rear lamps 7, 7. At the same time, coil 17 is energized in such fashion as to magnetize core 29 and thereby attract armature 21, drawing it down away from upper contact 20, provided that both rear lamps 7 are in good condition. Should either lamp 7 be burned out, or the filament broken from some other cause, the armature 21 will not be drawn down by core 29, as an insufficient current flows through the circuit because the armature then bypasses thermal unit 18 and causes indicator lamp 9 to remain constantly lighted. When the two rear lamps are both illuminated, thermal unit 18 receives enough current to heat up and interrupt the current periodically enough to cause indicator lamp 9 to blink or flash off and on, showing that the rear lamps are functioning properly.

The arrangement is such that when the rear lights are supplied with current by pressing brake pedal 5 and thereby closing the contacts 14 and 15, the thermal unit 18 immediately begins to expand and contract and thereby cause the front lamp or indicator 9 to alternately light up and go out or flash, thus indicating normal operating safe condition of the circuit as a whole. At the same time, the coil 17 is energized so as to cause core 29 to attract armature 21 and retain it down on the core as long as the brake pedal is down.

Of course, while it has been stated that when one rear stop light 7 is burned out, the indicator lamp 9 will not blink or flash, but will instead burn steadily, this is also true if both rear lamps 7, 7 should be burned out, for the armature 21 would in either case fail to be drawn down by core 29 when pedal 5 is depressed and thermal unit 18 would likewise not be capable of normal operation to cause indicator lamp 9 to blink or flash periodically.

In Figure 2 is shown a portion of the actual dash board of an automobile at 30, with a bezel 31 having a window 32 for the indicator lamp within this window. Other ways and means for showing the indicator light while protecting it in proper position for observation will suggest themselves to those skilled in the art.

Manifestly, variations may be resorted to, and parts and features may be modified or used without others within the scope of the appended claims.

Having now fully described my invention, I claim:

1. An electric indicator and stop light system of the character described, adapted for use upon an automobile provided with a brake pedal and a rear stop light for indicating operation of the brake pedal, said system including an electric current source having one pole grounded to the chassis of the car, a stationary first contact located in insulated condition upon the chassis, a movable contact electrically connected to the other pole of said current source adjacent to the stationary contact and mechanically connected to the brake pedal to be brought by the latter into active contact with said stationary contact upon depression of said brake pedal, an indicator disposed in the field of view of the driver of the automobile and having one pole thereof connected to said chassis, a relay coil with a core being connected at one end to the first stationary contact and at the other end to one pole of the rear stop light, the other pole of said rear stop light being connected to said chassis, conductor means interconnecting the other pole of said indicator and the first mentioned one end of said relay coil, a second stationary contact forming a relay contact connected to the last mentioned conductor means and located adjacent to said relay coil, an electrical resistance control unit connected in said conductor means between said second stationary contact and said relay coil, a movable relay contact operable adjacent to the relay core to make active contact with the second stationary contact, a conductor interconnecting the movable relay contact and the other end of said relay coil and also connected to the first mentioned one pole of said rear stop light.

2. An electric indicator and stop light system according to claim 1, wherein the electrical resistance control unit includes an automatically operated intermittent circuit breaker connected between the second stationary contact and the first mentioned one end of the relay coil and forming the sole connection therebetween.

References Cited in the file of this patent

UNITED STATES PATENTS

| | | |
|---|---|---|
| 1,183,476 | Maille | May 16, 1916 |
| 1,788,597 | Schultz | Jan. 13, 1931 |
| 2,103,276 | Schmidinger | Dec. 28, 1937 |
| 2,122,508 | Bell | July 5, 1938 |
| 2,141,210 | Foulks | Dec. 27, 1938 |
| 2,258,747 | Doane | Oct. 14, 1941 |
| 2,648,059 | Hostetler | Aug. 4, 1953 |